(12) United States Patent
Jessenig et al.

(10) Patent No.: US 12,181,611 B2
(45) Date of Patent: Dec. 31, 2024

(54) TIME-OF-FLIGHT TO DISTANCE CALCULATOR

(71) Applicant: ams International AG, Jona (CH)

(72) Inventors: Thomas Jessenig, Eindhoven (NL);
Robert Kappel, Eindhoven (NL);
Manfred Lueger, Eindhoven (NL);
Christian Mautner, Eindhoven (NL)

(73) Assignee: AMS INTERNATIONAL AG, Jona (CH)

( * ) Notice: Subject to any disclaimer, the term of this patent is extended or adjusted under 35 U.S.C. 154(b) by 709 days.

(21) Appl. No.: 17/441,132

(22) PCT Filed: Mar. 18, 2020

(86) PCT No.: PCT/EP2020/057447
§ 371 (c)(1),
(2) Date: Sep. 20, 2021

(87) PCT Pub. No.: WO2020/193313
PCT Pub. Date: Oct. 1, 2020

(65) Prior Publication Data
US 2022/0163645 A1    May 26, 2022

Related U.S. Application Data

(60) Provisional application No. 62/870,195, filed on Jul. 3, 2019, provisional application No. 62/822,148, filed on Mar. 22, 2019.

(51) Int. Cl.
*G01S 7/487*     (2006.01)
*G01S 7/4865*    (2020.01)
(Continued)

(52) U.S. Cl.
CPC .......... *G01S 7/4873* (2013.01); *G01S 7/4865* (2013.01); *G01S 17/10* (2013.01); *G01S 17/894* (2020.01)

(58) Field of Classification Search
None
See application file for complete search history.

(56) References Cited

U.S. PATENT DOCUMENTS

| 2008/0074636 A1* | 3/2008 | Yabe | G01C 15/002 356/5.01 |
| 2009/0116720 A1 | 5/2009 | Ritman | |

(Continued)

FOREIGN PATENT DOCUMENTS

| CN | 101149437 A | 3/2008 |
| CN | 103969222 A | 8/2014 |

(Continued)

OTHER PUBLICATIONS

Chinese office action issued for the corresponding Chinese patent application No. 2020800232159, dated Mar. 15, 2024, 8 pages (for informational purposes only).

(Continued)

*Primary Examiner* — Roy Y Yi
(74) *Attorney, Agent, or Firm* — VIERING, JENTSCHURA & PARTNER mbB

(57) ABSTRACT

Methods for detecting a time-of-flight include: emitting a light pulse toward a target; detecting a presence of light received at a light detector; obtaining a delay time between emitting the light pulse and detecting the presence of the light at the light detector; responsive to obtaining the delay time, (a) updating an overall intensity counter that counts a total number of delay times that have been obtained and (b) updating a delay time counter out of a plurality of different delay time counters, wherein each delay time counter counts a total number of delay times obtained that have a corresponding delay time value; and monitoring a threshold of each delay time counter to determine whether a threshold value is exceeded.

10 Claims, 8 Drawing Sheets

(51) Int. Cl.
*G01S 17/10* (2020.01)
*G01S 17/894* (2020.01)

(56) References Cited

U.S. PATENT DOCUMENTS

| | | | |
|---|---|---|---|
| 2009/0119044 A1* | 5/2009 | Levesque | G01S 7/487 |
| | | | 702/69 |
| 2016/0209498 A1 | 7/2016 | Kanter et al. | |
| 2017/0199271 A1* | 7/2017 | Nihei | H05B 47/115 |
| 2018/0067046 A1* | 3/2018 | Imagawa | G01N 21/64 |
| 2018/0364340 A1 | 12/2018 | Ichiyanagi | |
| 2018/0372851 A1 | 12/2018 | Kienzler et al. | |
| 2019/0049243 A1 | 2/2019 | Jung | |
| 2019/0235060 A1* | 8/2019 | Iwasawa | G02B 26/10 |

FOREIGN PATENT DOCUMENTS

| | | | |
|---|---|---|---|
| CN | 109085606 A | 12/2018 | |
| CN | 109100702 A | 12/2018 | |
| CN | 109387854 A | 2/2019 | |
| EP | 1903301 A2 | 3/2008 | |
| JP | 2016161438 A | 9/2016 | |
| JP | 2019039715 A | 3/2019 | |

OTHER PUBLICATIONS

International Search Report and Written Opinion dated Jun. 17, 2020 for corresponding International Application No. PCT/EP2020/057447.
Chinese search report issued for the corresponding Chinese patent application No. 202080023215.9, dated Sep. 21, 2023, 15 pages (for informational purposes only).

* cited by examiner

Q0..11_n_BIN0..31 are open drain outputs from counter

TIME-OF-FLIGHT TO DISTANCE CALCULATOR

RELATED APPLICATIONS

The present invention is a U.S. National Stage under 35 USC 371 patent application, claiming priority to Serial No. PCT/EP2020/057447, filed on 18 Mar. 2020; which claims priority from U.S. Provisional Application No. 62/822,148 filed 22 Mar. 2019; U.S. Provisional Application No. 62/870,195 filed 3 Jul. 2019, the, entirety of each of which are incorporated herein by reference.

TECHNICAL FIELD

The present disclosure relates to time-of-flight to distance calculations.

BACKGROUND

For time-of-flight (TOF) applications, a synchronous light pulse is sent out, and the reflection from a target is measured synchronous by a high speed light sensor. The time delay between the sent and receive of this light pulse is stored into multiple time bins (e.g., a counter) so as to create a time histogram. It may be possible to determine the distance to the object by identifying the bin with the largest number of counts and determining with what time delay that identified bin is associated.

SUMMARY

In general, in some aspects, the subject matter of the present disclosure is embodied in methods including: emitting a light pulse toward a target; detecting a presence of light received at a light detector; obtaining a delay time between emitting the light pulse and detecting the presence of the light at the light detector; responsive to obtaining the delay time, (a) updating an overall intensity counter that counts a total number of delay times that have been obtained and (b) updating a delay time counter out of a plurality of different delay time counters, wherein each delay time counter counts a total number of delay times obtained that have a corresponding delay time value; an monitoring a threshold of each delay time counter to determine whether a threshold value is exceeded.

Implementations of the methods can include one or more of the following features. For example, in some implementations, the methods include: determining that a first delay time counter exceeds the threshold value based on the monitoring; and calculating, based on the delay time value associated with the first delay time counter that exceeded the threshold value, a distance to a target.

In some implementations, the methods include: determining that a first delay time counter exceeds the threshold value based on the monitoring; responsive to determining that the first delay time counter exceeds the threshold value, identifying a signal-to-noise (SNR) threshold value for the first delay time counter; and determining whether the SNR threshold value exceeds a baseline intensity value. The methods may further include: determining that the SNR threshold value exceeds the baseline intensity value; and discontinuing updates to the overall intensity counter and to the plurality of delay time counters. The methods may include: determining that the SNR threshold value does not exceed the baseline intensity value; and determining whether the threshold value corresponds to a maximum value of the first delay time counter. The methods may include: determining the threshold value of the first delay time counter is not the maximum value of the first delay time counter; and selecting a different value as a new threshold value. The methods may include continuing updates to the overall intensity counter and to the plurality of delay time counters until the new threshold value is exceeded. The methods may include: determining the threshold value of the first delay time counter is the maximum value of the first delay time counter; compressing a dynamic range of the plurality of delay time counters to obtain a new threshold value; and continuing updates to the overall intensity counter and to the plurality of delay time counters until the new threshold value is exceeded.

In some implementations, the methods include: determining that a maximum time period has elapsed without any of the plurality of delay time counters exceeding the threshold value; determining a difference between a current value of each of the delay time counters and the threshold value; and for at least the delay time counter having the smallest difference, calculating a distance to a target. The methods may include prior to calculating the distance to the target: identifying a minimum required signal-to-noise (SNR) value for the threshold value; and determining that the minimum required SNR value exceeds a baseline intensity value.

In general, in some aspects, the subject matter of the present disclosure is encompassed by methods that include: emitting a light pulse toward a target; detecting a presence of light received at a light detector; obtaining a delay time between emitting the light pulse and detecting the presence of the light at the light detector; responsive to obtaining the delay time, (a) updating an overall intensity counter that counts a total number of delay times that have been obtained and (b) updating a delay time counter out of a plurality of different delay time counters, wherein each delay time counter counts a total number of delay times obtained that have a corresponding delay time value; determining that a maximum time period has elapsed; responsive to determining that the maximum time period has elapsed, determining a difference between a current value of each of the delay time counters and a threshold value; and for at least the delay time counter having the smallest difference, calculating a distance to a target.

Implementations of the methods may include, for example, prior to calculating a distance to the target: identifying a minimum required signal-to-noise (SNR) value for the threshold value; and determining that the minimum required SNR value exceeds a baseline intensity value.

In general, in some aspects, the subject matter of the present disclosure is encompassed by time-of-flight monitoring circuits that include: a delay time calculator configured to obtain a light pulse emission time and a light pulse detection time and to calculate a delay time as a difference between the light pulse emission time and the light pulse detection time; an overall counter coupled to the delay time calculator and configured to count a total number of delay times that have been calculated by the delay time calculator; a plurality of delay time counters coupled to the delay time calculator, wherein each delay time counter counts a total number of delay times having a corresponding delay time value that have been calculated by the delay time calculator; and an threshold check circuit coupled to the plurality of delay time counters, wherein the threshold check circuit is configured to monitor an threshold of each delay time counter to determine whether any of the plurality of delay time counters exceeds a threshold value.

Implementations of the monitoring circuits may include one or more of the following features. For example, in some implementations, the time-of-flight monitoring circuit includes: a memory comprising a signal-to-noise (SNR) lookup table coupled to the threshold check circuit. The memory further may further include an intensity threshold value lookup table.

Implementations of the techniques and devices disclosed herein may have multiple advantages. For instance, in some implementations, the techniques and devices disclosed herein do not require high processing power to find a delay time counter having the highest value. By reducing the amount of processing power required, the thermal power dissipation, in turn, can be reduced allowing higher resolution direct time of flight cameras to be developed.

Recording and generating a histogram of time-of-flight values may consume a substantial amount of power. In some implementations, the presently disclosed techniques and devices may be used to cease integration, if a predetermined signal-to-noise ratio (SNR) for detecting a peak count of delay times is reached, thus leading to a reduction in processing power.

In some implementations, the reduction in circuit processing allows less processing intensive circuits to be used. In some cases, such circuits can even be implemented on the same chip as the light emitter and detector elements, thus reducing the system size and, in some cases, allowing for a reduction in chip (e.g., die) size. In some implementations, the techniques and devices disclosed herein allow higher frame rates to be achieved.

The details of one or more embodiments are set forth in the accompanying drawings and the description below. Other features and advantages will be apparent from the description, drawings, and claims.

DETAILED DESCRIPTION

A time-of-flight (TOF) camera attempts to resolve the distance between the detector and a subject by measuring the round trip time of an artificial light signal provided by the camera. Exemplary TOF cameras may include many pixels, e.g., on the order of 60 pixels or more. For each pixel, a delay time between the emission of a light signal and its detection after reflection from the subject is recorded and stored in one of multiple bins (e.g., 32 bins) based on the particular value of the delay time, thus creating a histogram of the different delay times. The bin having the highest number of counts for a particular delay time value may, depending on the signal to noise ratio, correspond to actual time required for a light signal to make the round trip from the camera to the subject and back to the camera. Other bins may record counts as well, which may be due to ambient light or other uncorrelated sources. To determine which bin has the greatest number of counts, and thus may be representative of the time-of-flight, a circuit can be configured to compare the values of the different bins. Depending on the particular circuit construction, this process may consume a significant amount of power and a significant amount of time.

Figure 1:
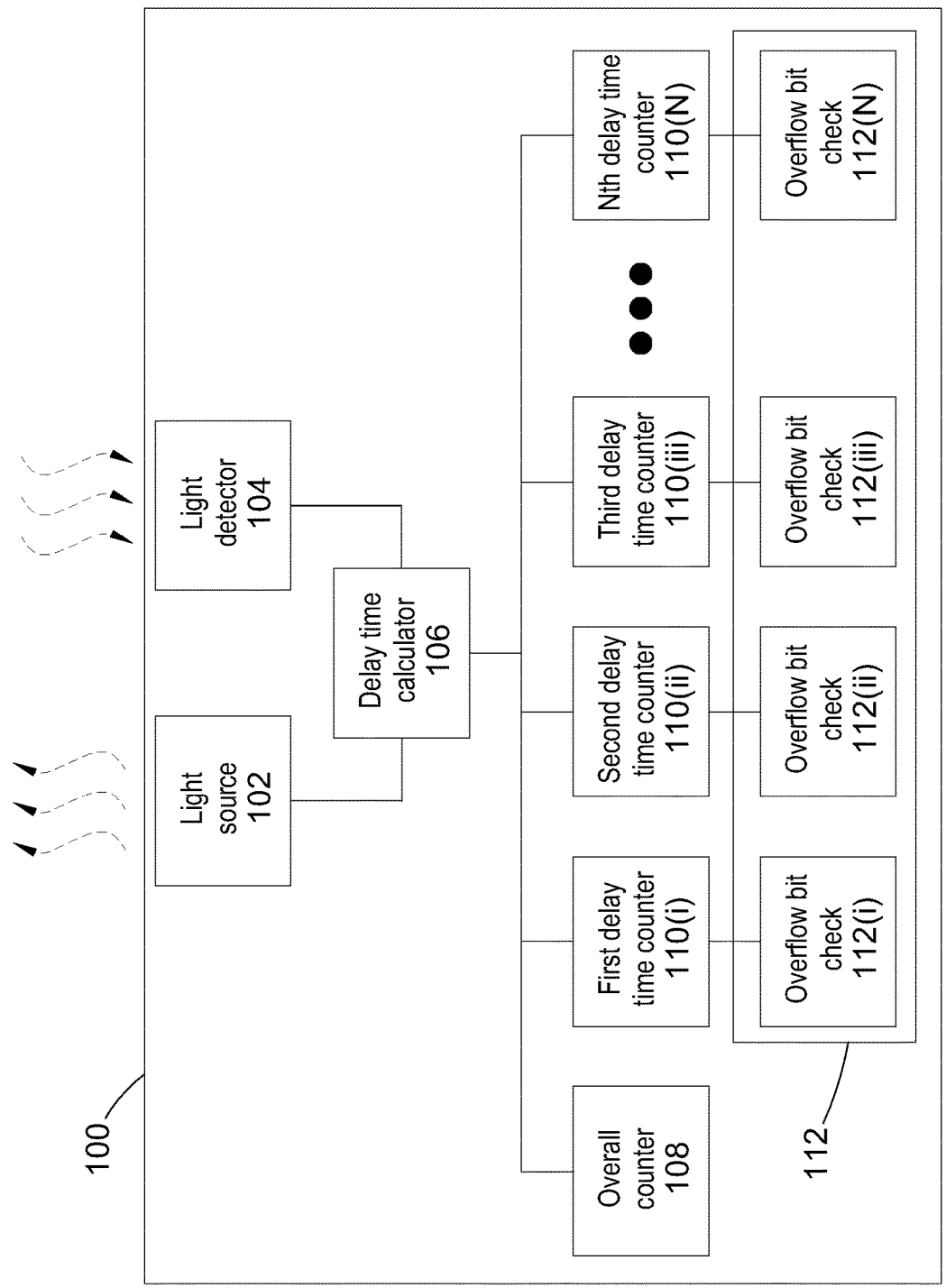
FIG. 1 a schematic illustrating a first portion of an exemplary time-of-flight monitoring circuit.

The present disclosure is directed to techniques and devices for providing a simplified evaluation process that determines which bin has the greatest number of delay time counts and which allows, in certain cases, a reduction in processing time and power to be achieved. In particular, the techniques disclosed herein for determining which bin has the greatest number of delay time counts include providing a delay time counter for each bin, in which the delay time counter counts the number of delay times stored to the bin with which the counter is associated, and monitoring a threshold of each delay time counter to determine whether a threshold value has been reached. If the threshold has been reached for a counter, then the delay time associated with that delay time counter is selected for further evaluation as the likely time needed for the light signal to complete its round trip. By looking at the threshold value rather than by comparing the value of each counter to one another, it is possible, in some implementations, to substantially reduce the amount of processing power and time needed to determine the specific time-of-flight. Moreover, if a threshold value is exceeded, but a desired signal-to-noise (SNR) ratio is not achieved, the presently disclosed techniques and devices may be used to compress a dynamic range of the delay time counters so that the threshold value may be increased and a desired SNR can be achieved. Additionally, in some cases, the presently disclosed techniques and devices may be used to cease integration time of a monitoring circuit when a desired SNR is achieved despite a threshold not having been reached, in order to FIG. 1 is a schematic illustrating a first portion of an exemplary TOF monitoring circuit 100. The TOF monitoring circuit 100 includes a light source 102 and a light detector 104. The light source 102 can include, e.g., a vertical cavity surface emitting laser or a light emitting diode, among other types of light sources. The light detector 104 may include, e.g., photodiodes such as a single-photon avalanche diode or a pinned photodiode, among other types of detectors. The light source emits light, e.g., in the form of light pulses in which the pulses are very short. The emitted light illuminates and may be reflected by an object back toward the detector 104. The detector 104 records a measurement of the light reflected from the object. For instance, in some implementations, the detector 104 may record a single photon. In some cases, however, the detector 104 also records the "presence" of a light that is erroneously due to noise, e.g., shot noise. In either case, a delay time calculator 106 of the TOF monitoring circuit 100 calculates a delay time based on the time at which the light pulse was emitted by the light source 102 and the time at which the reflected light pulse (or noise) was detected at the light detector 104. Though the light source 102, light detector 104, and delay time calculator 106 are shown here as part of the TOF monitoring circuit 100, any one or all of these elements can be formed separately from the TOF monitoring circuit 100.

Depending on the value obtained by the delay time calculator 106, one of multiple different delay time counters 110(*i*)-110(N) may increment a count. For instance, if the delay time calculator 106 calculates a delay time of 17 ns, a delay time counter associated with delay times between 15 ns and 20 ns may be incremented. Alternatively, if the delay time calculator 106 calculates a delay time of 12 ns, a delay time counter associated with delay times between 10 and 15 ns may be incremented. The total number of delay time counters determines the available resolution of the TOF monitoring circuit. The total number, N, of delay time counters may include, e.g., 16 counters, 24 counters, 32 counters, 40 counters, 50 counters, among other numbers of counters.

The TOF monitoring circuit 100 also includes an overall counter 108. The overall counter 108 counts a total number of delay times recorded by the TOF monitoring circuit 100. That is, the overall counter 108 counts, as a single sum, the number of delay times recorded by the delay time counters 110. For instance, if a first delay time counter 110(*i*) records two pulses, a second delay time counter 110(*ii*) records two pulses, and a third delay time counter 110(*iii*) records ten pulses, then a total number of counts recorded by the overall counter 108 is fourteen.

The TOF monitoring circuit 100 also includes a threshold detection circuit 112. Threshold detection circuit 112 is configured to monitor/evaluate if any of the delay time counters 110 has reached a threshold value. By monitoring whether any of the delay time counters 110 has reached a threshold, instead of comparing the value of each delay time counter 100 to one another to see which is greatest after a set period of time, the threshold detection circuit 112 may provide, in certain implementations, a reduction in the required processing time and power consumed. For instance, FIG. 1 depicts one such example of a threshold monitoring circuit 112 configured in this manner. In particular, the threshold monitoring circuit 112 of FIG. 1 includes multiple overflow bit check circuits 112(*i*) to 112(N). Each overflow bit check circuit 112 is coupled to a different corresponding delay time counter 110. More specifically, each overflow bit check circuit 112 monitors a value of a value of a single bit in each corresponding delay time counter 110. The bit monitored may be referred to as an "overflow" bit that, when changing state, signifies a threshold has been reached. For instance, the overflow bit of each delay time counter 110 may be predefined as the most significant bit of the counter. Moreover, if the most significant bit changes state from a 0 to a 1, this may signify that a threshold value has been reached, which in turn means a predefined number of delay time counts has been recorded by that particular counter. The particular overflow bit check circuit 112 coupled to the delay time counter in which the threshold was reached may then set a flag identifying that particular delay time counter for the remainder of the process performed by the TOF monitoring circuit 100. The position of the overflow bit is not restricted to the most significant bit of the counter, however, and can be any bit within each delay time counter. In certain implementations, the position of the overflow bit is the same in each delay time counter. Additionally, the overflow or threshold condition does not necessarily have to occur when the bit state changes from 0 to 1 but instead can be when the bit state changes from 1 to 0. The total number, N, of overflow bit check circuits 112 in the example of FIG. 1 is the same as the total number of delay time counters 110.

Figure 2:
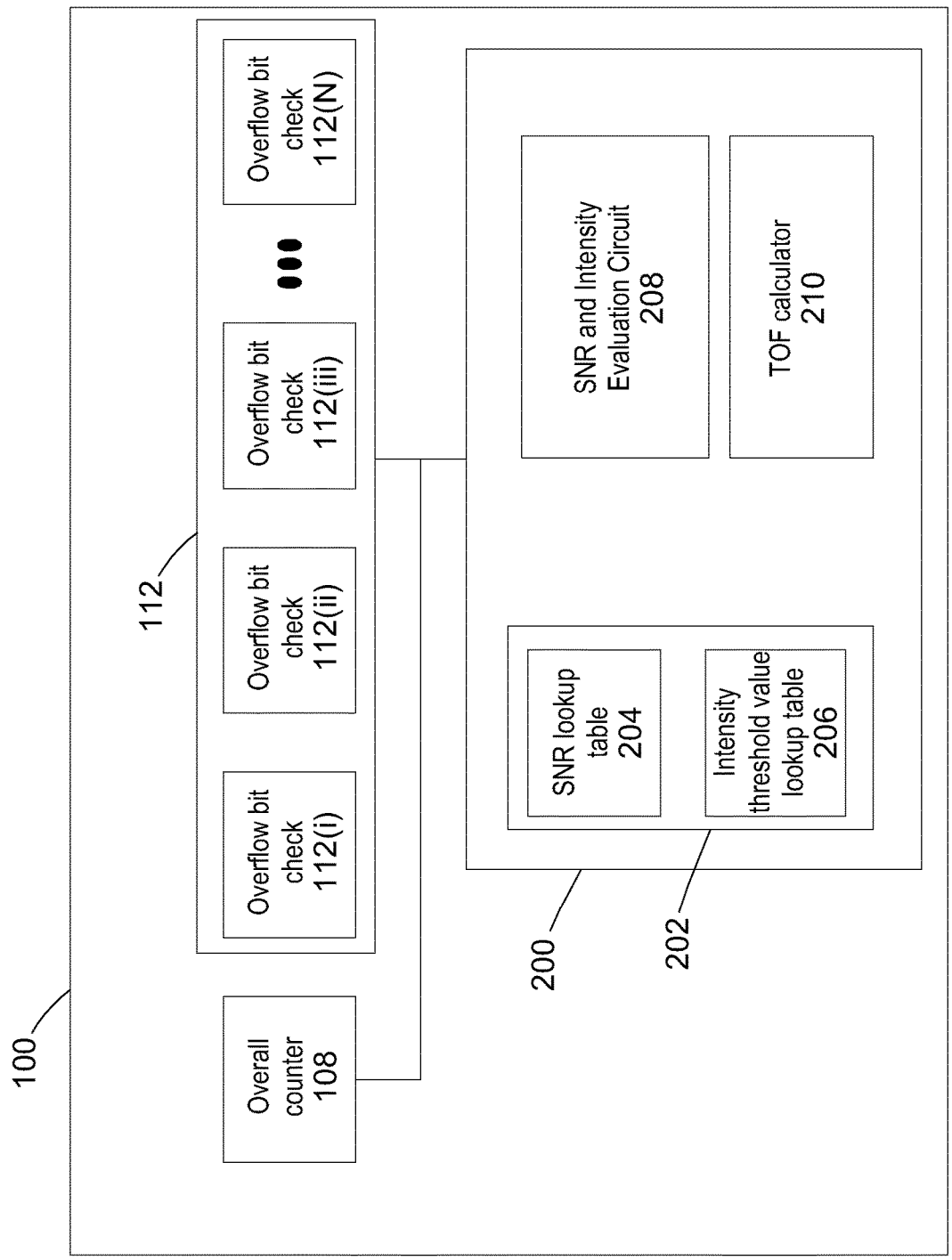
FIG. 2 is a schematic that illustrates a second portion of the exemplary TOF monitoring circuit.

FIG. 2 is a schematic that illustrates a second portion of the exemplary TOF monitoring circuit 100. As shown in FIG. 2, both the overall counter 108 and the threshold detection circuit 112 (which may be formed from multiple overflow bit check circuits as explained herein) are coupled to a TOF calculation circuit 200. The TOF calculation circuit 200 may include, e.g., a digital state machine or a microprocessor that, when programmed, is configured to perform operations disclosed herein. The TOF calculation circuit 200 may receive an overall count of time delays recorded by the overall counter 108. The TOF calculation circuit 200 also may receive the total counts recorded by each individual time delay counter of the threshold detection circuit 112. The TOF calculation circuit 200 is configured to use the received time delay counts and total number of delay time counts to calculate a distance to the object and determine whether a target object is in range. Additionally, the TOF calculation circuit 200 may be configured to evaluate whether the recorded counts reach a desired threshold SNR level, to evaluate whether a light detection integration time has been reached, and to modify a threshold value for the threshold detection circuit 112.

The TOF calculation circuit 200 includes memory 202. Memory 202 may store, among other things, data representative of a SNR lookup table 204 and an intensity threshold value lookup table 206. SNR lookup table 204 may store, e.g., a first array of SNR values indexed according to corresponding threshold values. For instance, each SNR value in the first array may represent a predefined target SNR value that is desired when a certain threshold value of a delay time counter is reached. In some implementations, the threshold value identified in the first array may be represented by the bit position that corresponds to the selected overflow bit of a delay time counter, such that the threshold values in the first array are a function of the selected overflow bit. Alternatively, or in addition, the SNR values in the first array are indexed according to a cumulative delay time count. For instance, each SNR value in the first array may represent a predefined target SNR value that is desired when a certain threshold number of delay time counts has been recorded, such that the SNR values are a function of the number of delay time counts over all the delay time counters, over an individual delay time counter, or over multiple numbers of delay time counters less than all the delay time counters.

Intensity threshold value lookup table 206 may store, e.g., a second array of intensity threshold values. The intensity threshold values in the second array may be indexed according to the corresponding threshold values. For instance, the intensity threshold values may represent a predefined target intensity for the overall time delay counter 108 as a function of the particular selected threshold value. In some implementations, the threshold value identified in the first array may be a function of the bit position that corresponds to the selected overflow bit of a delay time counter. Alternatively, or in addition, the intensity threshold values in the second array are indexed according to time step of the light detection process. That is to say, in some implementations, the light detection process disclosed herein includes a defined starting point at which the accumulated light begins to be integrated. The integration process may be timed according to a clock that increments at predefined time steps. The target intensity values of the second array then may be defined as a function of the particular time step. Alternatively, or in addition, the target intensity values may be defined as a function of the overall time of the integration process. That is, the intensity values may alternatively or additionally be indexed according a cumulative amount of integration time that has elapsed. In some implementations, memory 202 also may store the counts recorded by overall counter 108 and overflow bit check counters 112.

TOF calculation circuit 200 also includes an SNR and intensity evaluation circuit 208. The SNR and intensity evaluation circuit 208 may be configured to derive a SNR value from the recorded delay time counts and determine whether the derived SNR value meets a specified minimum SNR determined from the SNR lookup table 204. Depending on whether the minimum SNR is reached, and in some cases whether other conditions are satisfied, the TOF calculation circuit 200 may further be configured to perform one or more additional operations. For instance, in some implementations, the TOF calculation circuit 200 may be configured to compress a histogram of the delay time counts. As an example, this compression may be achieved by subtracting a predefined value from a maximum count value. In some implementations, the TOF calculation circuit 200 may be configured to stop integration if a minimum SNR is achieved. In some implementations, the TOF calculation circuit 200 may be configured to determine a number of counts required to reach a threshold level if the minimum SNR is achieved.

TOF calculation circuit 200 also includes a TOF calculator 210. TOF calculator 210 may be configured to determine a distance to an object. For instance, TOF calculator 210 may be configured to receive the delay time value associated with the greatest number of counts and use that delay time value to calculate the distance to the object.

Figure 3:
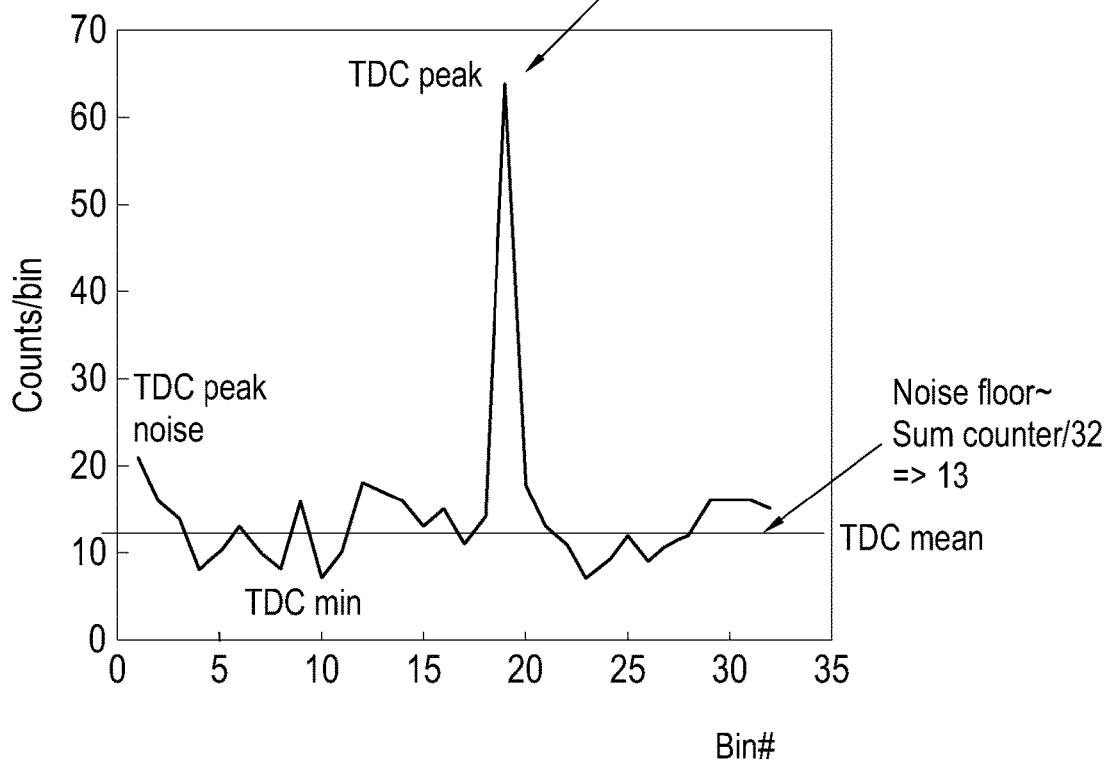
FIG. 3 is a plot of a histogram representative of recordation of delay time counts by different delay time counters.

FIG. 3 is a plot of a histogram that illustrates delay time counts recorded by different delay time counters, such as delay time counters 110 shown in FIG. 1. In particular, the histogram represents the distribution of delay time values recorded by the different delay time counters 110. The vertical axis represents the number of counts and the horizontal axis (labeled "Bin#") represents the different delay time values. So, for example, in the histogram shown in FIG. 3, the total number of bins is 32 meaning that there are 32 different delay time values (including ranges of values) that can be identified by the circuit 100. In the example of FIG. 3, the total number of counts rarely exceeds 20. In general, these counts may be due to noise, e.g., shot noise, rather than a true indicator of the delay time between an emitted and detected pulse. In contrast, a bin located at position 19 in the histogram shows a high number of counts (e.g., greater than 60) indicating that a large number of delay times having the value associated with bin 19 were recorded. As explained herein, the TOF monitoring circuit 100 may be configured to evaluate each bin to determine whether a threshold has been reached and, if so, whether one or more other conditions have been satisfied before determining a distance to the object.

Figure 4:
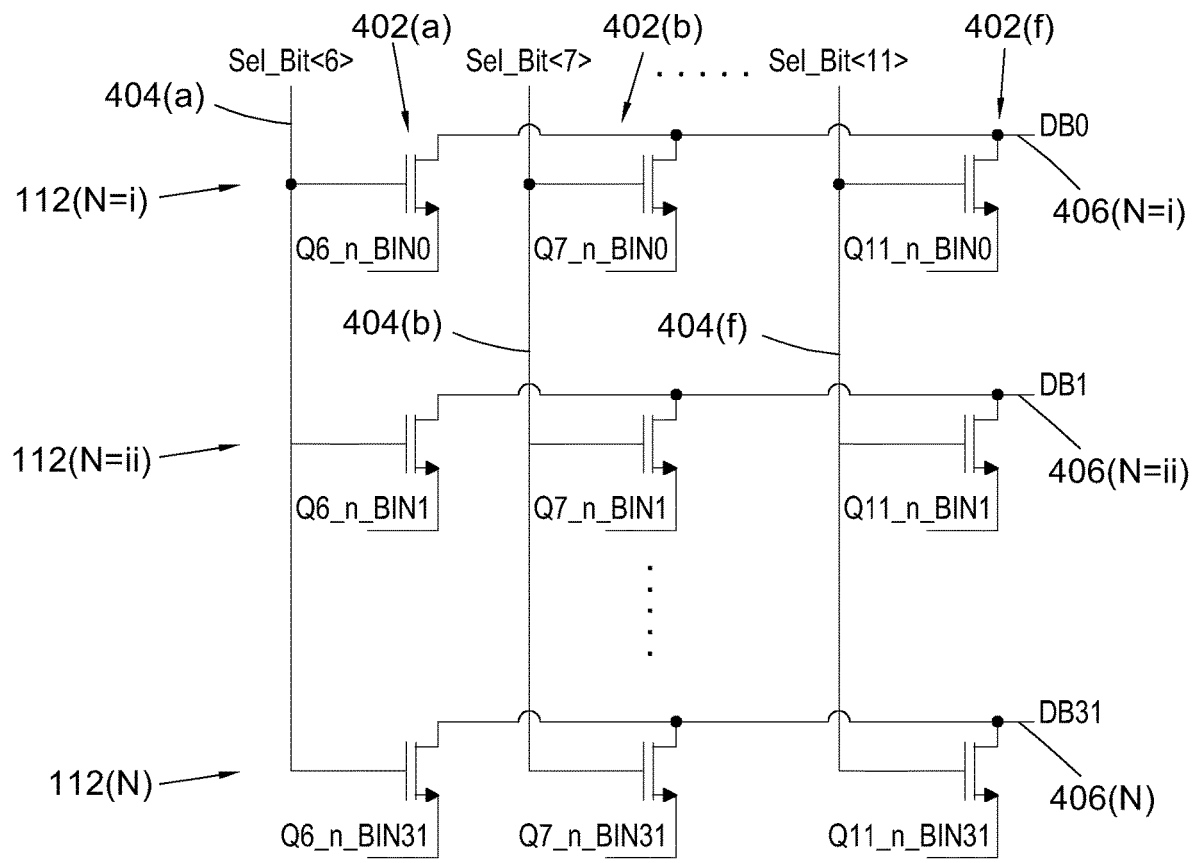
FIG. 4 is a circuit schematic of exemplary overflow bit check circuits.

As explained herein, the TOF monitoring circuit 100 includes a threshold detection circuit 112 that is configured to monitor/evaluate if any of the delay time counters 110 has reached a threshold value. The threshold detection circuit 112 may be configured to include multiple overflow bit check circuits 112, each of which monitors a value of a value of an "overflow" bit in a corresponding delay time counter 110. FIG. 4 is a circuit schematic of exemplary overflow bit check circuits 112. In particular, FIG. 4 depicts a corresponding overflow bit check circuit 112(N) for each of the N=32 delay time counters, with circuits 112(N=iii) through 112(N=xxx) omitted for clarity. Referring to overflow bit check circuit 112($i$) as an example, the circuit 112($i$) includes multiple re-channel CMOS transistors 402. A source of each transistor 402 in circuit 112($i$) is connected to a different bit of a corresponding delay time counter 110 (e.g., delay time counter 110($i$) shown in FIG. 1). For instance, the source for transistor 402($a$) may be connected to a bit located at bit position number 6 of delay time counter 110($i$). Similarly, the source of transistor 402($b$) may be connected to a bit located at bit position number 7 of delay time counter 110($i$), whereas the source of transistor 402($f$) may be connected to a bit located at bit position number 11 of delay time counter 110($i$). Transistors connected to bit positions 8-10 are omitted for clarity. Likewise, as also shown in FIG. 4, a source of each transistor 402 in circuit 112($ii$) is connected to a different bit of a corresponding delay time counter 110 (e.g., delay time counter 110($ii$) shown in FIG. 1). Similar configurations apply for each circuit 112, i.e., the sources of the transistors within each circuit 112 are respectively connected to different bit positions of corresponding delay time counters 110.

To determine which bit of a delay time counter 110 is monitored by a threshold detection circuit 112, a select bit line 404 is coupled to the gate of each transistor 402. Accordingly, if the select bit line 404 is set high, that select bit will turn on the transistor 402 to which the select bit line 404 is coupled, allowing the bit position of the corresponding delay time counter 110 to be read out onto drain line 406. For instance, if select bit line 404($a$) is set high, and the other select bit lines are set low, then each of transistors 402($a$) in the different threshold detection circuits 112 will be turned on to read the output value of bit position 6 in the corresponding delay time counters 110 to drain line 406. On the other hand, if select bit line 404($f$) is set high, and the other select bit lines are set low, then each of transistors 402($f$) in the different threshold detection circuits 112 will be turned on to read the output value of bit position 11 in the corresponding delay time counters 110 to drain line 406.

If the value on the drain line 406 of a circuit 112 changes (e.g., from a "1" to a "0" or a "0" to a "1"), then this may serve as an indicator that the delay time counter 110 associated with that circuit 112 or bin has reached the threshold. Accordingly, the value associated with the counter 110 that has reached the threshold may be representative of the true time-of-flight. For instance, referring to FIG. 3, if the overflow bit is set to bit position 6 of the counter, then a threshold value is reached when a delay time counter records $2^6$=64 counts of a particular delay time value.

In some implementations, however, the signal to noise ratio of the number of counts to the average noise detected may not be sufficiently high to have confidence that the particular delay time value corresponds to the true time-of-flight value. For instance, referring to FIG. 3, the noise floor may be represented as the overall delay time counter obtained from sum counter 108 divided by the total number of different delay time counters/bins. If this noise floor is too high, then the SNR may be too low despite the threshold value being reached for a particular delay time counter. In such cases, the TOF monitoring circuit 100 may increase the threshold value to allow counting to continue and a greater SNR to be achieved. Alternatively, or in addition, the TOF monitoring circuit 100 may compress the histogram, as explained herein, to allow a greater number of counts to be obtained and a greater SNR to be achieved.

Alternatively, in some implementations, no threshold is reached in a predefined time window for evaluating whether any of the delay time counts reach a threshold. In such cases, the TOF monitoring circuit 100 may cease integration and determine the SNR for each delay time counter. If the SNR is sufficient, the TOF monitoring circuit 100 may then calculate the distance to the object based on the delay time counter having the greatest number of delay time counts at the time integration ceased. Alternatively, if SNR is insufficient, the TOF monitoring circuit 100 may increase the threshold and/or compress the histogram to allow a greater number of counts to be obtained and a greater SNR to be achieved.

Figure 5:
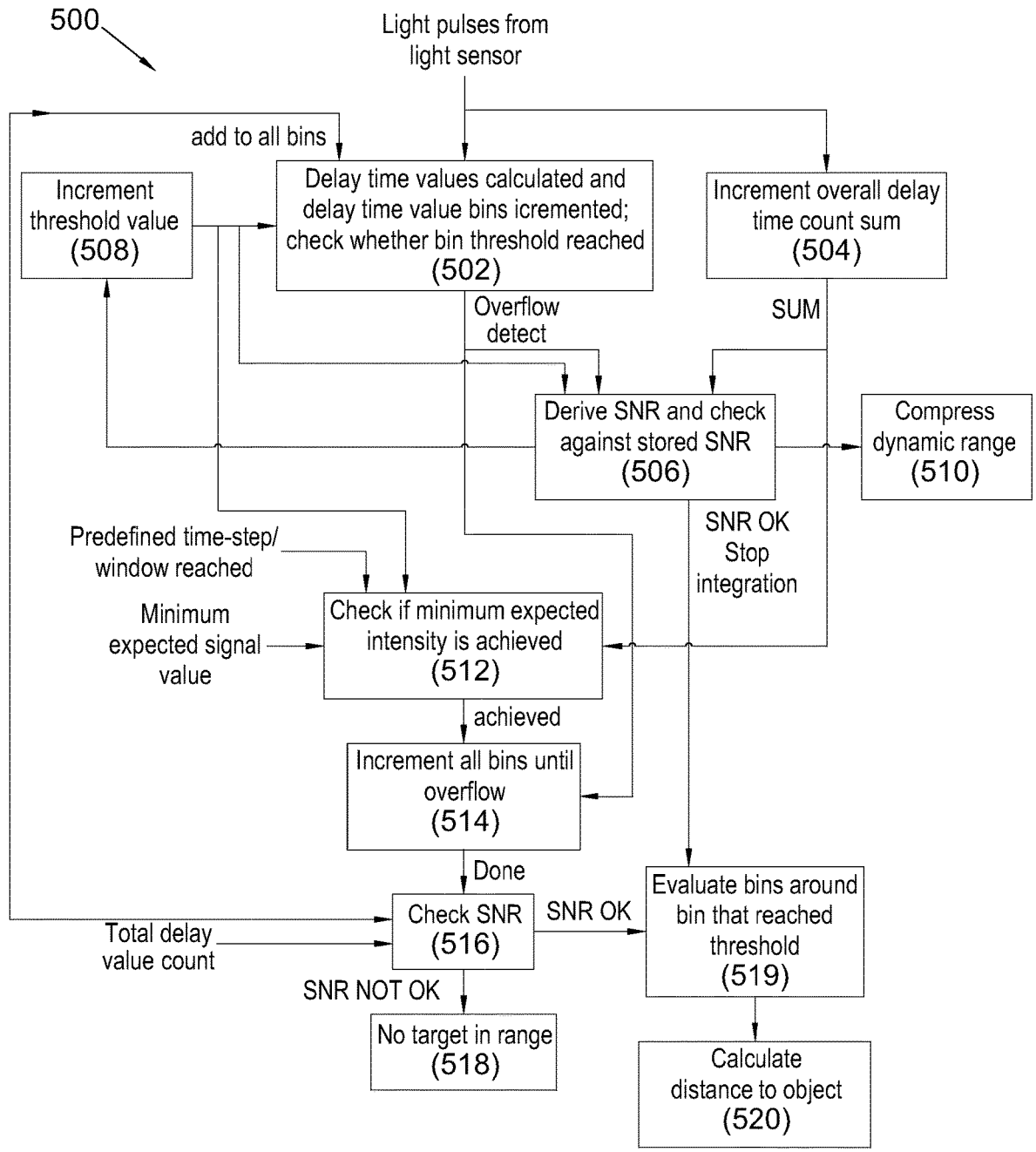
FIG. 5 is a flowchart that details a general exemplary process for calculating distance to an object based on TOF information.

Additional details regarding the process steps of a TOF monitoring circuit are set forth below. For example, FIG. 5 is a flowchart that details a general exemplary process 500 for calculating distance to an object based on TOF information. Process 50 may be performed by a TOF monitoring circuit, such as TOF monitoring circuit 100. In a first step (502), a light pulse is recorded by a light detector (e.g., light detector 104) from which a measurement of a delay time value is calculated (e.g., by delay time calculator 106). A bin associated with that calculated value then is incremented, where the bin also is monitored as to whether it reaches a threshold number of counts. For example, a delay time counter 110 associated with the delay time value may be incremented and is monitored by threshold detection circuit 112 as to whether a pre-selected overflow bit is set. Simultaneously, at step (504), a sum of the overall pulse count is incremented using, e.g., overall counter 108.

If the number of delay time counts reaches a threshold (e.g., the threshold detection circuit 112 detects a change at the pre-selected overflow bit), then a SNR value is calculated (506). For instance, the TOF calculation circuit 200 may be notified that one of the overflow check bit circuit 112 was triggered by an overflow bit changing state. The TOF calculation circuit 200 then may use information received from the delay time counter 110 that triggered the overflow as well as an overall sum of delay time values counted from the overall counter 108. Using this information, the TOF calculation circuit 200 may calculate the SNR. For example, the TOF calculation circuit 200 may obtain a SNR as a ratio of the total number of delay time values counted in the delay time counter 110 that triggered the overflow to an average number of delay time values counted. The average number of delay time values counted may be expressed as the total number of delay time values counted by the overall counter 108 divided by the total number of bins into which the delay time values can be divided.

After the SNR is calculated, the TOF calculation circuit 200 may compare the calculated SNR against a minimum SNR. The minimum SNR may be obtained, e.g., from the SNR lookup table 204. As explained herein, the minimum SNR values stored in lookup table 204 may be indexed according to the threshold value and/or the total delay time value count. Accordingly, the particular minimum SNR that is retrieved from the lookup table 204 may be selected based, e.g., as a function of the particular threshold value being monitored and/or as a function of the total delay time count. In this way, more stringent minimum SNR values may be applied for the comparison when there are fewer measurement results leading to potentially less confidence in the analysis. For instance, if the threshold value is a first number of data points (e.g., 60 counts of a particular delay time value), then a first minimum SNR value is retrieved from the lookup table 204. However, if the threshold value is a second number of data points that is smaller than the first number (e.g., 40 data points), then a second different minimum SNR value (e.g., a higher minimum SNR) may be retrieved from the lookup table 204.

With the minimum SNR retrieved from the lookup table 204, the comparison against the calculated SNR is performed. For instance, the comparison may be performed by the SNR and intensity evaluation circuit 208. If the calculated SNR is greater than the minimum SNR, then the TOF monitoring circuit 100 may stop integration and calculate a distance to the object (step 520). Otherwise, if the calculated SNR is less than the minimum SNR, the TOF calculation circuit 200 may perform one of two different steps to improve the calculated SNR value. As a first option, the TOF calculation circuit 200 may increase the threshold value (508). For example, the TOF calculation circuit 200 may change the selected bit position of each delay time counter 110 being monitored as the overflow bit by the overflow bit check circuits 112. In a particular example, the TOF calculation circuit 200 may increment the overflow bit to be the next most significant bit of the delay time counter. By incrementing the overflow bit, the circuit allows a greater number of delay time counts to be recorded, thus potentially increasing the calculated SNR.

If the most significant bits of the delay time counters 110 are already selected as the overflow bits, the TOF calculation circuit 200 may compress the count dynamic range (510). For instance, the TOF calculation circuit 200 may subtract a fixed amount from the maximum range of counts of each of the delay time counters 110. As an example, if the maximum number of counts recorded is 2000, a fixed amount of 1024 may be subtracted from this maximum count, thus providing further range for additional counts to be recorded. The process 500 then can continue again at step 502 to calculate and record delay time values.

As explained herein, the integration process may be associated with a defined window of time during which integration occurs. Alternatively or in addition, the recordation of the delay time value counts may be associated with a predefined time-step that, once this time-step has elapsed, triggers the TOF monitoring circuit 100 to modify the integration process.

For example, in some implementations, a time-step or window of time may be predefined for the period during which the delay time values are calculated and counted. If this predefined time-step or window of time is reached, the TOF monitoring circuit 100 may calculate the distance to the object even if the threshold value has not been reached. For instance, in some cases, as shown in FIG. 5, if a predefined time-step or window of time has been reached, the TOF monitoring circuit 100 may check whether an expected signal intensity for the predefined time has been achieved (512). In a particular example, the SNR and intensity evaluation circuit 208 may obtain, from the intensity threshold value lookup table 206, a minimum intensity threshold value. The minimum intensity threshold value may correspond to, e.g., a minimum number of delay time value counts recorded by the TOF monitoring circuit 100. As explained herein, the minimum intensity threshold value may be indexed as a function of the integration time (e.g., the predefined time-step or window of time) with, e.g., higher minimum intensity threshold values being required for shorter integration times and lower values being required for longer integration times. Alternatively, or in addition, the minimum intensity value may be a function of the threshold value set by the overflow bit with, e.g., higher minimum intensity values being required when the bit position is less significant and lower minimum intensity values being required when the bit position is more significant.

Using the information obtained from the lookup table 208 and the overall delay time counter 108, the SNR and intensity evaluation circuit 208 may, in some implementations, evaluate whether the total number of delay time values counted (as obtained from the overall counter 108) exceeds the minimum intensity value. If the minimum is not exceeded, the TOF monitoring circuit 100 may continue the delay time value recordation process at 502 until, e.g., the next time step is reached.

If the minimum value is exceeded, the SNR and intensity evaluation circuit 208 then may calculate an actual SNR value and compare that actual SNR value to a minimum required SNR value obtained from the lookup table 204. Since the delay time count threshold has not yet been reached, however, the TOF monitoring circuit 100 can induce the threshold to be triggered. For example, in some implementations, the TOF monitoring circuit 11 can force the bins (e.g., the delay time counters 110) to increment (514), i.e., without recording a delay time value caused by an actual light pulse, until the threshold value is reached for one of the bins.

Once the threshold value is reached for one of the delay time counters 110, the SNR and intensity evaluation circuit 208 then evaluates (516) the SNR for that particular counter, as previously explained herein. For instance, the SNR and intensity evaluation circuit 208 obtains a minimum SNR from the lookup table 204 according to the predefined threshold value and/or the total number of delay time value counts.

If the calculated SNR does not exceed the minimum SNR obtained from the lookup table 204, then the TOF monitoring circuit 100 may determine that no target is in range (518). If the calculated SNR does exceed the minimum SNR from the lookup table 204, then the TOF monitoring circuit 100 may calculate (200) the distance to the object. In some implementations, the TOF monitoring circuit 100 also evaluates (519) the bins adjacent to the bin that reached the threshold value to improve the distance calculation accuracy. For example, in addition to calculating the distance based on the delay time value associated with the bin that reached the threshold count, the TOF monitoring circuit 100 may also calculate a distance(s) based on delay time value(s) associated with the next nearest bin or bins to the bin that reached the threshold value. In some implementations, the TOF monitoring circuit 100 may calculate the distance based on the delay time values associated with the nearest two, three, four, five, or six bins to the bin that reached the threshold value.

Figure 6A:
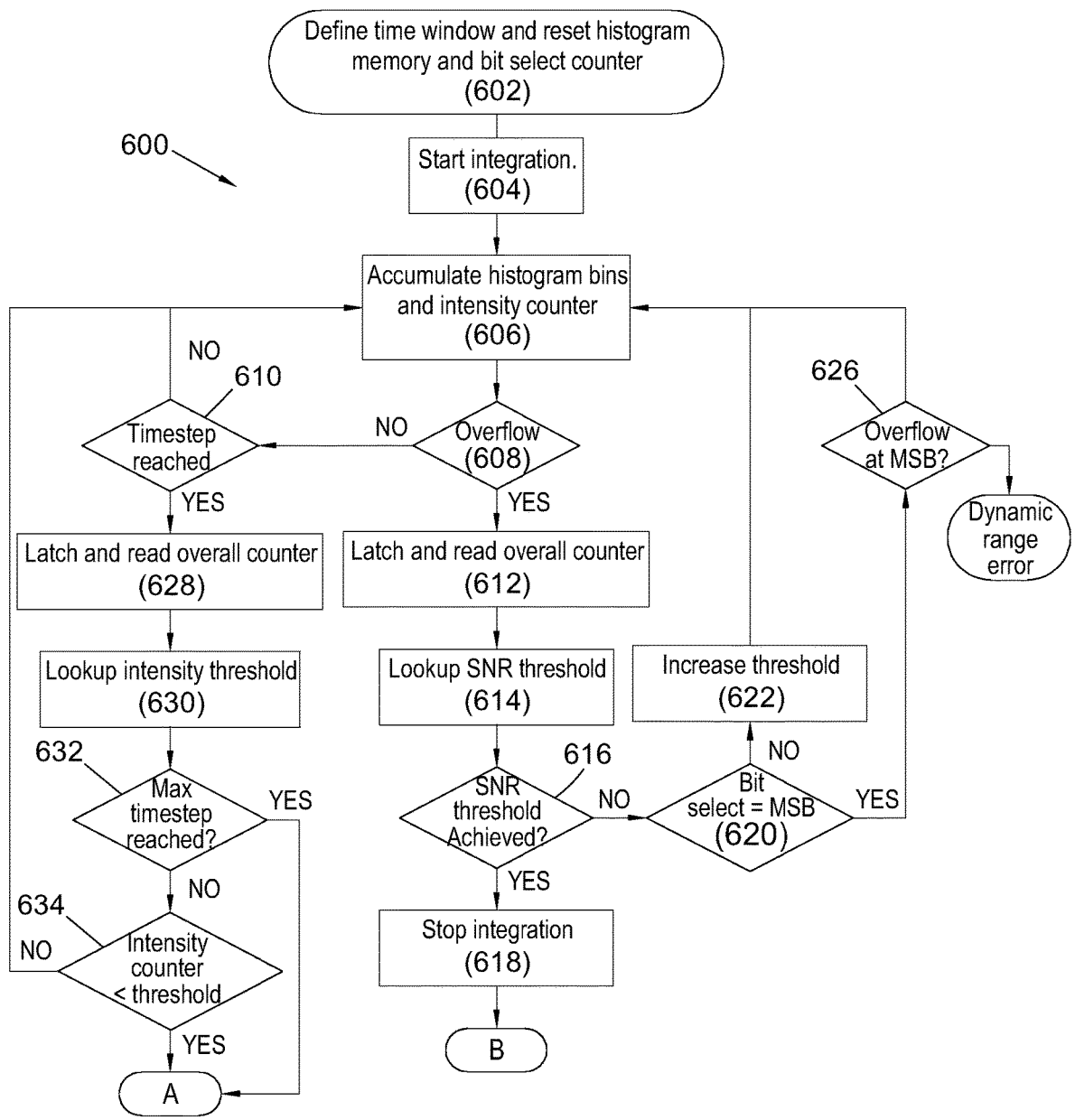
FIGS. 6A-6B are a flowchart that details a general exemplary process for calculating distance to an object based on TOF information.
Figure 6B:
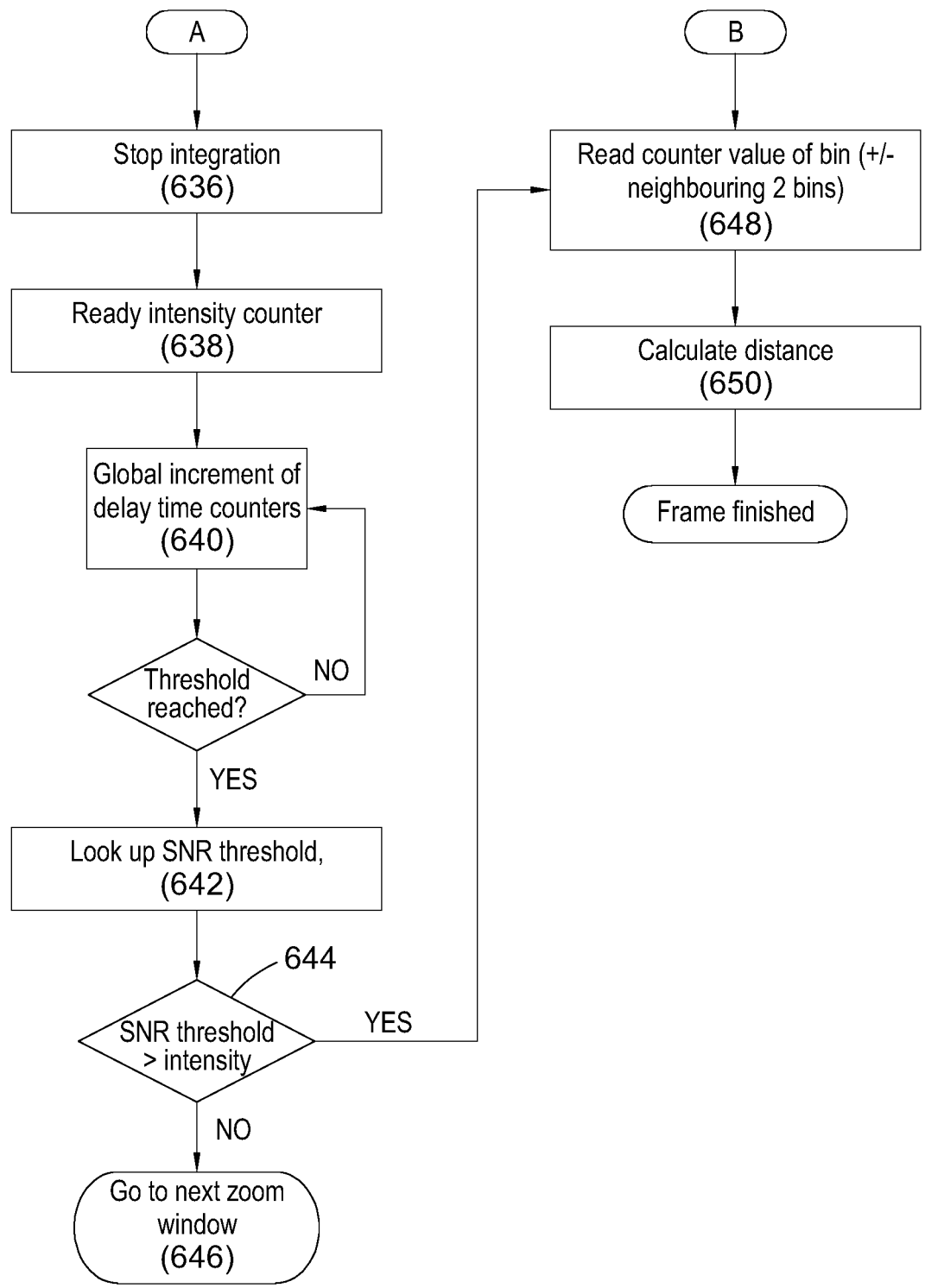

FIGS. 6A-6B is a flowchart that details a more specific exemplary process 600 for calculating distance to an object based on TOF information. Process 600 may be performed by a TOF monitoring circuit, such as TOF monitoring circuit 100. In a first step (602), and prior to the start of integration, an integration time window is defined, a delay time value histogram is cleared, and a threshold delay time value count is set. Defining the integration window may include, e.g., setting a maximum integration time as well as a time-step. The maximum integration time may be defined as a multiple of the time-steps. Clearing the delay time value histogram may include, e.g., resetting the delay time counters 110 to zero. Setting a threshold delay time value count may include, e.g., selecting a particular bit position of each of the delay time counters 110 to serve as the overflow detection bit. For example, the initial threshold value may set to be 16 delay time value counts, which would correspond to a bit position of 4 for each delay time counter 110. After initializing the TOF monitoring circuit, integration is started (604).

At step (606), the histogram bins (e.g., the delay time counters 110) and an intensity counter (e.g., the overall delay time value counter 108) accumulate delay time value counts. At step (608), it is determined whether an overflow has occurred. For instance, it is determined whether the overflow bit of any of the delay time counters 110 have switched states. If no overflow has occurred, the process 600 proceeds to step (610) where it is determined if the predefined time-step has been reached. If the predefined time-step has not been reached, the integration process continues at step (606). If an overflow has occurred, the TOF monitoring circuit latches the overall delay time counter at its current value (612). In this case, the integration may still run in the background. A minimum SNR target value then is obtained (614) from a SNR lookup table (e.g., table 204). The minimum SNR target value selected may have a value that is a function of the threshold value (e.g., overflow bit) and/or the total number of delay time value counts recorded so far.

After obtaining the minimum SNR target value, the target SNR is compared (616) to the actual SNR. The actual SNR may be calculated as the ratio of the threshold value to the average bin count across all the bins. If the SNR threshold is achieved, then integration is stopped (618) and the process 600 proceeds to B (see FIG. 6B) where the distance to the object is calculated. If the target SNR is not achieved, then it is checked (620) whether the threshold value is the maximum value that can be recorded by the delay time counter. For example, the TOF monitoring circuit may check whether the overflow bit is set to the most significant bit of each delay time counter.

If the threshold value is not the maximum value that can be recorded by the delay time counter, then the threshold value may be increased (622). Increasing the threshold value may include, e.g., moving the overflow bit to the next most significant bit. For example, the overflow bit may be changed from bit position 4 of each delay time counter to bit position 5 of each delay time counter. If the threshold value is the maximum, e.g., the overflow bit is set to the most significant bit of the delay time counter 110, then the dynamic range may be compressed. For instance, in some implementations, a value (624) is subtracted from all delay time counters before the next window starts. A second check then is performed to determine (626) whether there is still an overflow at the most significant bit of the delay time counter. If there is still an overflow, then the TOF monitoring circuit 100 reports an invalid frame due to dynamic range error. If there is no overflow, then the integration process returns to step 606 where it is continued until an overflow event happens or a next time-step is reached.

If the next time-step is reached but the threshold value has not been reached (e.g., the overflow bit has not changed state), then the TOF monitoring circuit latches and reads (628) the overall counter 108 at its current value. The TOF monitoring circuit also may look up (630) an intensity threshold from a lookup table (e.g., lookup table 206). The particular intensity threshold value obtained from the lookup table may be a function of the predefined time-step and window of the integration process. It is then determined (632) whether the maximum time-step has been reached. If a maximum time-step has been reached, process 600 proceeds to A (see FIG. 6B). If the maximum time-step has not been reached, a comparison (634) of intensity counter threshold against the actual intensity (e.g., the value of the overall counter 108) is performed. If the actual intensity value is less than the threshold, then process 600 returns to step (606) where integration is continued. If the actual intensity value is greater than the threshold, the process proceeds to A.

Referring to FIG. 6B, and continuing at A, integration is stopped (636) if the actual intensity value is determined to be greater than the threshold intensity obtained from the lookup table. The intensity counter (e.g., overall counter 108) is read (638). Then a global increment of all the delay time counters 110 is performed (640) until a threshold value (e.g., overflow bit changing state) is reached. The number of increments required to reach the threshold value may be save to memory. Once the threshold value is reached, a minimum SNR value is obtained (642) from a lookup table (e.g., table 204). The SNR value obtained from the lookup table may be compared (644) to the intensity (e.g., overall counter value). If the SNR threshold is less than the intensity counter value, then the process 600 determines that no target is found (646) in the histogram. If the SNR threshold is greater than the intensity value, then the process proceeds to calculation of the object distance. For example, process 600 may include reading (648), the delay time counter values of the bins adjacent to the bin that reached the threshold value. Using the information from the adjacent bins and the bin that reached the threshold value, the TOF monitoring circuit then may calculate (650) the distance to the object, after which the process 600 ends.

Figure 7:
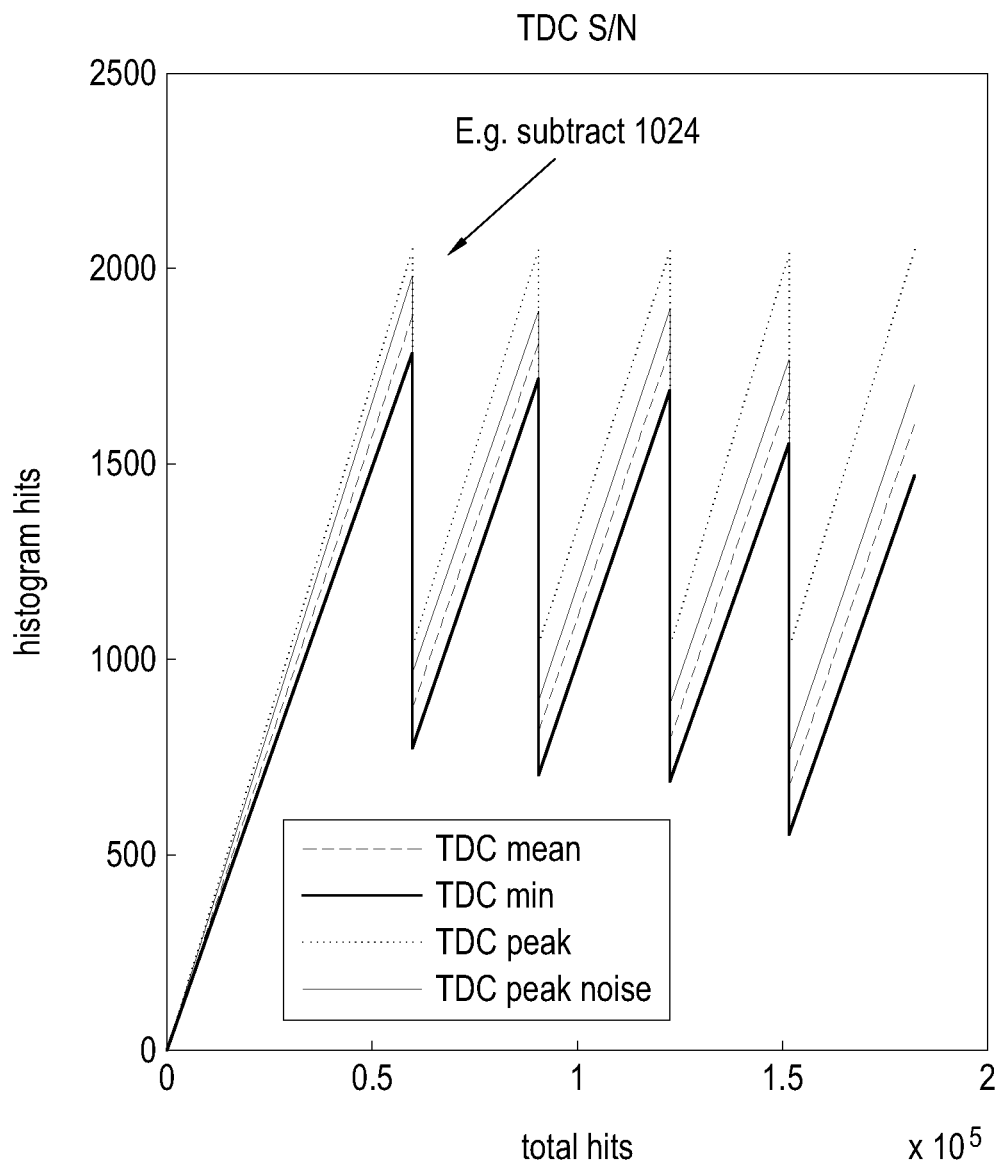
FIG. 7 is a plot illustrating an example of dynamic range compression.

FIG. 7 is a plot illustrating an example of dynamic range compression according to the present disclosure. As shown in the plot, the vertical axis represents the number of histogram hits. For instance, this could represent the number of delay time values recorded by one of the delay time counters 110. The horizontal axis represents the total number of hits, i.e., the total number of delay time values recorded by the TOF monitoring circuit. The plot thus can provide a representation of the signal-to-noise of the TOF monitoring circuit as a function of the variation in number of hits for a particular delay time counter and the overall number of delay time counts. When a delay time counter reaches its maximum value that can be recorded, the dynamic range of the counter can be compressed so that counting can continue. An example implementation for compressing the dynamic range is to subtract some fixed constant from the delay time counter. For instance, as shown in FIG. 7, a value of 1024 may be subtracted once the delay time counter reaches its maximum, allowing the counter to continue counting as the total number of hits recorded by the TOF monitoring circuit continues.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

In some cases, the processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

A number of embodiments have been described. Nevertheless, it will be understood that various modifications may be made without departing from the spirit and scope of the invention. Accordingly, other embodiments are within the scope of the following claims.

The invention claimed is:

1. A method comprising:
   emitting a light pulse toward a target;
   detecting a presence of light received at a light detector;
   obtaining a delay time between emitting the light pulse and detecting the presence of the light at the light detector;
   responsive to obtaining the delay time,
   (a) updating an overall intensity counter that counts a total number of delay times that have been obtained and
   (b) updating a delay time counter out of a plurality of different delay time counters, wherein each delay time counter counts a total number of delay times obtained that have a corresponding delay time value;
   monitoring a threshold of each delay time counter to determine whether a threshold value is exceeded;
   determining that a first delay time counter exceeds the threshold value based on the monitoring;
   responsive to determining that the first delay time counter exceeds the threshold value, identifying a signal-to-noise (SNR) threshold value for the first delay time counter;
   determining that the SNR threshold value does not exceed the baseline intensity value; and
   determining whether the threshold value corresponds to a maximum value of the first delay time counter.

2. The method of claim 1, further comprising:
   determining that a first delay time counter exceeds the threshold value based on the monitoring; and
   calculating, based on the delay time value associated with the first delay time counter that exceeded the threshold value, a distance to a target.

3. The method of claim 1 comprising:
   determining the threshold value of the first delay time counter is not the maximum value of the first delay time counter; and
   selecting a different value as a new threshold value.

4. The method of claim 3 comprising continuing updates to the overall intensity counter and to the plurality of delay time counters until the new threshold value is exceeded.

5. The method of claim 1 comprising:
   determining the threshold value of the first delay time counter is the maximum value of the first delay time counter;
   compressing a dynamic range of the plurality of delay time counters to obtain a new threshold value; and
   continuing updates to the overall intensity counter and to the plurality of delay time counters until the new threshold value is exceeded.

6. The method of claim 1 comprising:
   determining that a maximum time period has elapsed without any of the plurality of delay time counters exceeding the threshold value;
   determining a difference between a current value of each of the delay time counters and the threshold value; and
   for at least the delay time counter having the smallest difference, calculating a distance to a target.

7. The method of claim 6, further comprising, prior to calculating the distance to the target:
   identifying a minimum required signal-to-noise (SNR) value for the threshold value; and
   determining that the minimum required SNR value exceeds a baseline intensity value.

8. A method comprising:
   emitting a light pulse toward a target; detecting a presence of light received at a light detector;
   obtaining a delay time between emitting the light pulse and detecting the presence of the light at the light detector;
   responsive to obtaining the delay time,
   (a) updating an overall intensity counter that counts a total number of delay times that have been obtained and
   (b) updating a delay time counter out of a plurality of different delay time counters, wherein each delay time counter counts a total number of delay times obtained that have a corresponding delay time value;
   determining that a first delay time counter exceeds the threshold value based on the monitoring;
   responsive to determining that the first delay time counter exceeds the threshold value, identifying a signal-to-noise (SNR) threshold value for the first delay time counter;
   determining that the SNR threshold value does not exceed the baseline intensity value; and
   determining whether the threshold value corresponds to a maximum value of the first delay time counter
   determining that a maximum time period has elapsed;
   responsive to determining that the maximum time period has elapsed, determining a difference between a current value of each of the delay time counters and a threshold value; and
   for at least the delay time counter having the smallest difference, calculating a distance to a target.

9. The method of claim 8, prior to calculating a distance to the target:
   identifying a minimum required signal-to-noise (SNR) value for the threshold value; and
   determining that the minimum required SNR value exceeds a baseline intensity value.

10. A time-of-flight monitoring circuit comprising: a delay time calculator configured to obtain a light pulse emission time and a light pulse detection time and to calculate a delay time as a difference between the light pulse emission time and the light pulse detection time; an overall counter coupled to the delay time calculator and configured to count a total number of delay times that have been calculated by the delay time calculator; a plurality of delay time counters coupled to the delay time calculator, wherein each delay time counter counts a total number of delay times having a corresponding delay time value that have been calculated by the delay time calculator; an threshold check circuit coupled to the plurality of delay time counters, wherein the threshold check circuit is configured to monitor an threshold of each delay time counter to determine whether any of the plurality of delay time counters exceeds a threshold value; memory comprising a signal-to-noise (SNR) lookup table and an intensity threshold value lookup table coupled to the threshold check circuit; an SNR and intensity evaluation circuit configured to derive a SNR value from the recorded delay time counts and determine whether the derived SNR value meets a specified minimum SNR determined from the SNR lookup table.

* * * * *